United States Patent [19]
Anderson

[11] Patent Number: 6,115,819
[45] Date of Patent: *Sep. 5, 2000

[54] SECURE COMPUTER ARCHITECTURE

[75] Inventor: Mark Stephen Anderson, Salisbury, Australia

[73] Assignee: The Commonwealth of Australia, Anzac Park, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,908
[22] PCT Filed: May 18, 1995
[86] PCT No.: PCT/AU95/00296
 § 371 Date: Nov. 26, 1996
 § 102(e) Date: Nov. 26, 1996
[87] PCT Pub. No.: WO95/33239
 PCT Pub. Date: Dec. 7, 1995

[30] Foreign Application Priority Data

May 26, 1994 [AU] Australia ................. PM5895

[51] Int. Cl.[7] ................................... G06F 12/14
[52] U.S. Cl. ............................................. 713/200
[58] Field of Search .............................. 395/186, 187.01, 395/188.01, 609, 490, 491; 380/3, 4, 23, 25; 713/200, 201, 202

[56] References Cited

U.S. PATENT DOCUMENTS

| | | | |
|---|---|---|---|
| 4,584,639 | 4/1986 | Hardy ....................................... | 395/186 |
| 4,791,565 | 12/1988 | Dunham et al. ........................... | 380/4 |
| 4,882,752 | 11/1989 | Lindman et al. ......................... | 380/25 |
| 4,962,533 | 10/1990 | Krueger et al. ........................... | 380/25 |
| 5,144,659 | 9/1992 | Jones ........................................ | 380/4 |
| 5,202,997 | 4/1993 | Arato ........................................ | 395/186 |
| 5,289,540 | 2/1994 | Jones ........................................ | 380/4 |
| 5,559,993 | 9/1996 | Elliott et al. .............................. | 380/4 |

*Primary Examiner*—Robert W. Beausoliel, Jr.
*Assistant Examiner*—Pierre E. Elisca
*Attorney, Agent, or Firm*—Baker & Maxham

[57] ABSTRACT

A secure computer architecture having a central processing unit, zero or more memories, at least one input, at least one output and a bus to communicate signals between the components which are all untrusted elements. The computer architecture also includes a trusted access monitor device, a trusted gateway device located between each of the memories, a further trusted gateway device located between each of the inputs and the bus, and a further trusted gateway device located between each of the outputs and the bus, where the access monitor device controls either the one-way or two-way direction of the signals through a respective gateway device. In one aspect of the invention each memory location is each of the zero or more memories, and each input and each output has a respective tag which is representative of a security related attribute associated with the data in that memory location or that input or that output. The trusted access monitor contains tags which are representative of other security attributes of the processes that can be processed by the central processing unit, whereby when the central processing unit attempts to perform an access to data in a memory location or an input operation using the input or an output operation using the output, the access monitor compares the respective tags and controls either the one-way or two-way direction of the signals through a respective gateway device. The architecture disclosed can be adapted to fit within a device which connects to a peripheral input/output port of an untrusted computer device.

9 Claims, 1 Drawing Sheet

SECURE COMPUTER ARCHITECTURE

This invention relates to trusted hardware devices that can be utilised in a general computer system architecture to provide a means of ensuring data transfers within the system architecture are secure. When the trusted hardware device is configured as a peripheral of a computer system the computer can be used for predetermined trusted functions.

BACKGROUND

The widespread use of computers for information storage and processing has resulted in the need for systems which can protect information which is of national security importance, commercially sensitive, or personal. Security measures are required which test users of computer systems security against unauthorised access to and modification of information stored in and processed by computer systems.

In response to the need for secure computers and computer systems for operation within classified environments, the United States Department of Defense has published the "Department of Defense Trusted Computer System Evaluation Criteria" (reference No DOD 5200.28-STD). This publication, typically referred to as the Orange Book, describes security measures including measurable objectives and evaluation criteria for assessing secure computers and computer system designs and implementations.

The Orange Book emphasises the concepts of the Trusted Computing Base (TCB) and the reference monitor. The TCB is the set of all resources in a system that together provide the security features of the system. The reference monitor is that part of the TCB which oversees all data accesses in the system, and will only permit those accesses that the user of the system has the authority to perform.

An approach taken by system developers in response to Orange Book security criteria was to implement TCBs into existing hardware platforms rather than develop completely new hardware, because of the large amount of capital investment in existing computer hardware. This approach meant that the TCB had to be implemented in software, and due to the functional requirements of the TCB and reference monitor, large and complicated software systems were developed from the ground up. This meant that the developers had to develop operating systems and kernels with built-in security in order to produce systems that satisfied the Orange Book Criteria.

However, efforts to build TCBs in such a manner have shown that there are a number of problems with this approach, namely:

(i) Increased development effort. The fact that the TCB is implemented in software means that extra effort had to be made to provide assurance that the TCB would function correctly. Verifying the correct operation of the TCB has proven to be an extremely time consuming exercise and can even be considered impractical if the TCB is too large.

(ii) Decreased performance. Applications running on a software implemented TCB will be slower since the TCB uses processor resources to perform security functions. Additionally in an effort to reduce the verification requirements on the TCB, the size of the TCB can be reduced by eliminating some of the functionality, which in turn reduces the performance of the whole system.

(iii) Reduced usability. The redesign of operating systems and kernels in order to implement a TCB in many cases has been quite extensive. This has resulted in incompatibilities between existing software and the new secure operating systems, which reduces the usability of the TCB. The security functions imposed by the TCB are often viewed as too restrictive by the users, as they can obstruct the users performing even routine tasks.

(iv) Decreased maintainability. Any changes that might be made to a software implemented TCB require that the TCB be re-evaluated, and this makes it difficult to add functionally to the TCB incrementally.

Different approaches were tried for developing trusted systems, including implementing the reference monitor in hardware so as to avoid many of the problems inherent with software implementation. One prior art design is the US National Computer Security Center's Logical Coprocessing Kernel which is commonly known as LOCK. The LOCK project involved the development of a reusable hardware module called SIDEARM (System-Independent Domain-Enforcing Assured Reference Monitor) that could be fitted to a number of systems and implemented a hardware version of the reference monitor function. The project also required the porting of an existing operating system (UNIX) onto a LOCK hardware platform.

Whilst the LOCK project showed that hardware implemented reference monitors avoid many of the problems of software TCB development, the development of LOCK style systems is still very time consuming and expensive. Additionally the SIDEARM is closely integrated into the particular resources of the hardware system it runs on and it remains to be seen if the LOCK design can be applied to a number of different hardware systems.

Abrams has proposed a generalised TCB software architecture for implementing trusted systems. Abrams proposed that the TCB be composed of a number of TCB subsets, each of which is responsible for providing some security-related functionality. This is basically a "divide and conquer" approach, where the TCB is split into a number of protection domains and the design includes a structure for implementing interdomain communications and making access control decisions that involve a number of domains.

The Abrams generalised TCB architecture is a framework for developing trusted systems from a software perspective. Abrams claims that once the framework has been refined and perfected then it would be possible to build hardware modules that implement the generalised TCB architecture and fit them into existing systems, in much the same manner as LOCK devices. It is not immediately evident how this might be implemented, and even if it will eventuate.

Whilst the developers of trusted computing platforms have not yet delivered suitable technologies for general purpose computing, others have integrated trusted functionality into existing general purpose systems.

For example, there exist untrusted general purpose computer systems which can be retrofitted with trusted hardware peripherals. These peripherals are arranged to provide services which enforce trust in a particular function of the untrusted computer.

One such device is specifically designed for use with an electrically and physically secure network handling classified data. When users at the secure network wish to send data out of the network, for example using email, they use a trusted peripheral attached to their typically untrusted workstation to apply a tamper-proof seal to the data. The data and seal are then transported over the secure network to further a trusted peripheral that acts as a gateway. This gateway device will check that the seal is valid, ie it verifies the data being sent out of the secure network is the same as that which was sealed, and if so passes the data to the external network.

The coordinated action of the trusted peripherals provides a basic integrity filter function operating on all data leaving the secure network. The use of an integrity filter ensures that the only data which leaves the secure network is that which has been approved by the network users. Thus the retrofitting of trusted peripherals to the secure network has provided trust in a particular subset of the secure network: operation.

The problems described above are typically related to the difficulty and complexity of developing trusted computer software and hardware. The inventors have developed an approach to the design of computer hardware having inbuilt trusted functionality. The same approach can be used to develop a hardware device which is used not unlike a peripheral to an untrusted computer which can provide predetermined security functions to that untrusted computer. The peripheral version of the device is able to be disconnected from the computer as required and may be used with another computer. The peripheral version of the device can be reconfigured to perform other security related functions or predetermined security functions.

BRIEF DESCRIPTION OF THE INVENTION

In a broad aspect of the invention a secure computer architecture comprises
a central processing unit means, at least one input means, at least one output means and bus means to communicate signals between each said means all being untrusted,
a trusted access monitor device connected to said bus means,
a trusted gate device located between each of said at least one input means and said bus means,
a further trusted gate device located between each of said at least one output means and said bus means,
wherein said access monitor device controls either the one-way or two-way direction of said signals through a respective gate device.

In a preferred aspect of the invention said access monitor controls said central processing unit.

In a preferred aspect of the invention the secure computer apparatus further comprises at least one memory means and a further trusted gate device located between said at least one memory means and said bus means and at least one memory location in the or each said memory means, and each of said at least one input and output means is associated with a respective tag which is representative of a security related attribute that can be processed by said central processing unit means, such that when the central processing unit means attempts to access a tagged memory location or use said input or output means, said access monitor controls the one-way or two-way direction of said signals through a respective gate device according to respective tags.

In a further preferred aspect of the invention said trusted access monitor device tags are changeable.

In a further preferred aspect of the invention the secure computer apparatus provided in a portable module adapted to connect to a peripheral input/output port of a computer device.

These and other aspects of the invention will be apparent from the following description of a preferred embodiment, which it will be understood, is illustrative only, and need not limit the invention to any one or combination of the following elements or features.

BRIEF DESCRIPTION OF THE DRAWING

In order that the invention may be more clearly understood, reference will now be made to the accompanying drawing, wherein.

DETAILED DESCRIPTION OF THE INVENTION

Figure 1:
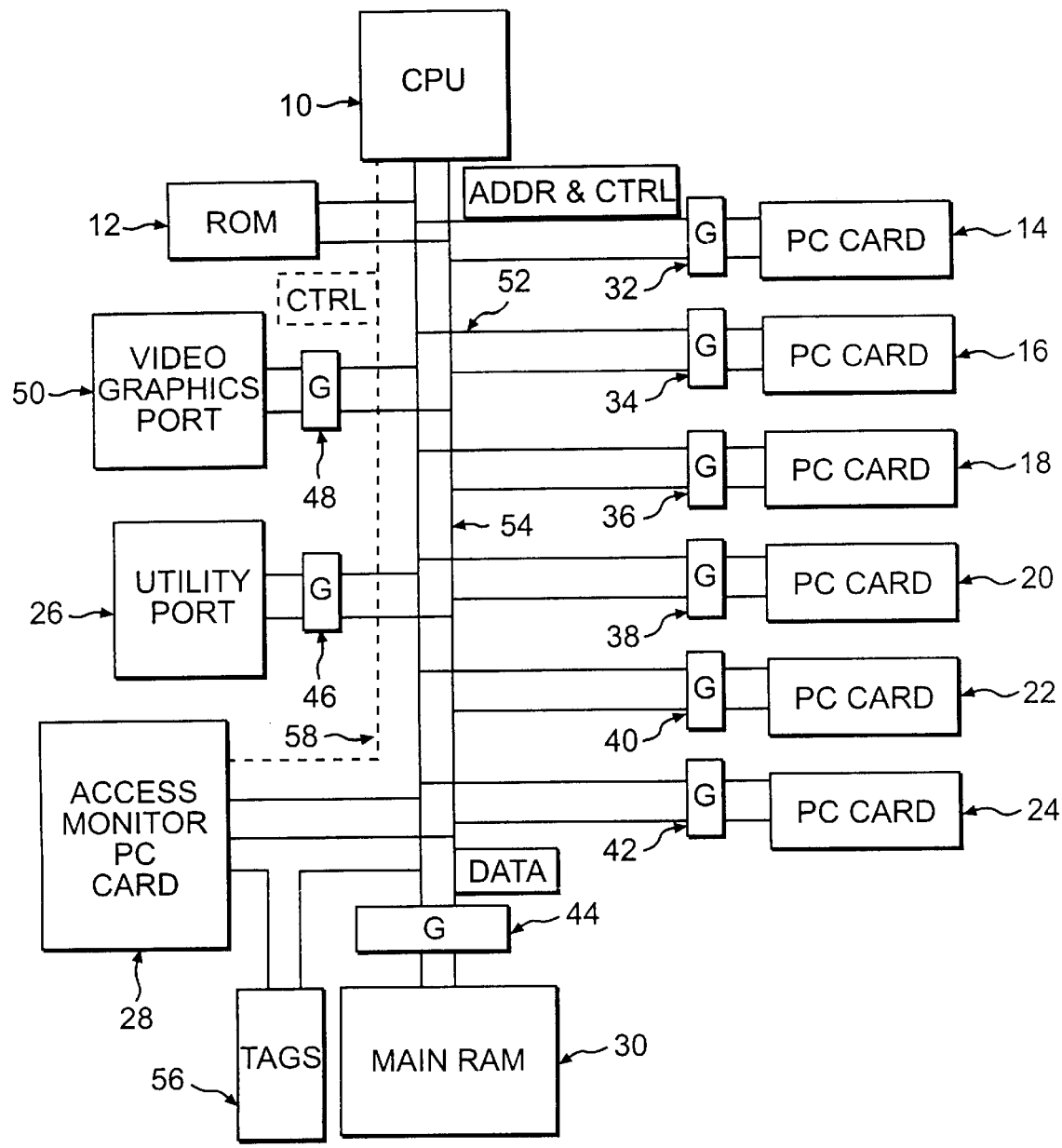
FIG. 1 depicts a functional block diagram of a computer system architecture having controlled and restricted signal transfer between elements of the computer system and which may also depict a separate computer peripheral device.

This specification details three separate but related aspects of the invention, namely:

(i) a removable or fixed hardware module called an access monitor which interfaces to a computer device and controls the operation of security gates which regulate data transfers within the computer device wherein tags may or may not be used since the explicit hardwired memory locations could replicate the function of tags in some cases;

(ii) the integration of the access monitor and security gates in a tagged memory architecture where the tag information is used by the access monitor in determining the control of security gates;

(iii) a trusted general purpose hardware computer peripheral device that contains the access monitor, security gate and tagged memory elements configurable to implement a security policy suited to the peripherals application.

In order that the invention may be more clearly understood, reference will be made to the accompanying drawing, FIG. 1, which depicts a functional block diagram of the architecture of the computer peripheral device described in item (iii) above, and which includes the elements described in items (i) and (ii).

Access Monitor and Security Gates

The access monitor and security gates together control by restriction the transfer of data between various elements of the computer system including the central processing unit, memory and I/O devices. The access monitor can be a removable hardware module that interfaces to a computing system and monitors every data transfer that occurs on the system bus. The security gates are hardware elements that are situated between the system bus and memory and I/O devices that make up the system. All data transfers to and from the memory and I/O devices in the system will pass through a security gate that is controlled by the access monitor.

In one example the access monitor is adapted to control the central processing unit and may in a preferred made of operation reset the central processing unit upon being initiation or being installed in the computer system, or at the time of other predetermined events.

The access monitor in the depicted embodiment may dynamically control a gate to allow data transfers in both directions (read and write), in just one direction or completely disable the transfer of data through a gate. The access monitor is configured to enforce the security policy relevant to the application that the computing device has been programmed to perform. A means of implementing this feature is also disclosed in this specification.

By monitoring the signals on the system bus the access monitor can determine the details of every data access that takes place, ie the address of the data being accessed and whether the access is a read or a write access. If the access monitor decides that the transaction is not permitted then it can disable the gate through which the data transfer would occur. When the CPU (central processing unit) of the system tries to perform a data transfer through a disabled gate, a memory access fault is generated.

Whilst the access monitor performs a similar function as the previously described SIDEARM device there are a number of significant distinguishing features.

Firstly, the access monitor is designed to be a removable and replaceable component in a hardware architecture. If the security policy that the access monitor and security gates enforce has to be changed then the access monitor can be removed, and a new access monitor programmed with the new security policy can take its place. Additionally the access monitor and security gates work together to enforce the reference monitor function. The two types of devices working together is the first aspect of the invention disclosed in this specification.

The access monitor of the invention operates largely independently of the other elements of the system. The SIDEARM in the LOCK architecture is closely coupled with the CPU and especially the MMU (memory management unit) of a system which is clearly different to the invention even though the access monitor and the security gates could be said to be a hardwire version of the reference monitor concept of the Orange Book.

FIG. 1 shows a typical computer device architecture adapted to accommodate an access monitor 28 and security gates 32, 34, 36, 38, 40, 42, 44, 46 and 48.

Access Monitor Implementation with Tagged Memory Systems

As previously mentioned, the access monitor can be configured to enforce a security policy relevant to the application specific operation of the computing device which the access monitor controls. One option for implementing this feature is the integration of the access monitor and security gate combination with a tagged memory system. However, it is possible to operate such a system without tagged memory where for example the address of the device sought to be accessed implies its security attributes.

In such a system, sets of zero or more memory locations and I/O devices that the system processor can access would have a tag associated with them. A tag has a digital representation which is interpreted by the access monitor as representing one or more security attributes relevant to the data or I/o device that the tag is associated with. In this embodiment all the tags are stored in a memory called the tag memory which is accessible only by the access monitor.

The access monitor itself may contain some internal tag registers that represent the security attributes of the process being executed by the processor. When the processor attempts to perform a data access the access monitor compares the contents of its internal tag register with the tag associated with the address of the data location being accessed. This effectively allows the access monitor to check that the security attributes of the process are suitable to allow the access to the data, and if the access is not allowed, to keep closed the gate through which the access would occur.

A Trusted Computer Peripheral Device

The access monitor and security gates combined with the tagged memory system are initially intended to be integrated into the hardware design of trusted computer peripheral devices, but could also be used in the architecture of trusted general purpose computers. The third aspect of the invention disclosed in this specification is the embodiment of a design for a trusted computer peripheral incorporating an access monitor, security gates and tagged memory. The peripheral device itself can be programmed to provide a particular security related function for the general purpose computer it is attached to. For example the peripheral device could be programmed to perform the integrity filter function as described previously, network to provide a secure gateway mechanism between a secure network and an external network which may or may not be secure.

FIG. 1 shows the architecture of the peripheral device. The physical elements of the computer device comprise a CPU 10, ROM 12, address bus 52, data bus 54 and memory mapped input/output ports 14, 16, 18, 20, 22 and 24, including a utility port 26 adapted to provide keyboard, keypad, and liquid crystal display device access and output, (LCD); a video graphics port 50 and an Access Monitor (AM) card 28. In addition to the above a main memory 30 comprising of a random access memory (RAM) space is present.

In general terms the elements described comprise a fully functional computer having a CPU system memory and input/output (I/O) devices.

Restrictions on the exchange or transfer of data between various elements of the system is controlled by the AM 28 which has control of gates 32–48 which are physically located between the system bus and various I/o devices and system memory.

Every access by the CPU 10 to system memory (for example RAM 30) is controlled by the Access Monitor 28 opening the gate 44.

In one embodiment of the invention, each of the respective gates associated with each memory location and each memory and I/O device has associated therewith a unique identifier called for convenience a 'tag'. When the CPU 10 requires access, for example, to a particular location in RAM it issues a control signal on its control bus 58 and generates the appropriate address signal on its address bus 52 and data bus 54. The AM detects these signals and looks up in the tag memory 56, the tag associated with that location. The AM uses the tag value to decide whether the access requested by the CPU is to be granted or denied. The AM may also hold in a programmable memory space all currently valid tag/s which it also uses to compare with the tag associated with the desired memory location before it allows the CPU to access that memory location.

A tag may represent amongst a number of things, a particular security level of access associated with the type of control signal (ie read or write); another control function; and/or a particular level of security associated with the memory location sought to be accessed.

Depending on the result of a comparison of the tag obtained from tag memory 56 with the tags in the AM's programmable memory space, access may or may not be permitted to that memory location. The AM will allow or disallow the access by controlling gate 44 to pass or not pass the read or write command.

Should an access to a memory location not be allowed during the current instruction, that memory access will fail and the address and/or data buses to the memory location will be effectively disconnected and the data in the memory will remain unread or unwritten. In other embodiments of the invention such as those incorporating a control bus one or more of the buses may be selectively blocked by the gate operation.

In one example this would appear to the CPU as though the memory location, or if the process is associated with a I/O device, either did not exist for that particular CPU operation.

The Access Monitor is preferably designed so that it contains a desired security policy which reflects the level of access possible during the time that particular AM is in use. A removable AM device means that the computer device can be disabled or returned to a general purpose task and changeable AM's or many different AM's allow the security policy to change in response to the AM in use at the time.

Each location in RAM has a tag and the RAM itself has a gate associated with it. However, the RAM which is merely a memory means does not need to be located in the secure computer apparatus. It may for example be a PCMCIA/PC CARD dedicated to act as a memory device in which for example each location of memory has a tag. Thus the PC CARD connected to an I/O with which is associated a gate is under the control of the AM.

Each memory and I/O device (eg. PCMCIA/PC CARD), the video graphics port 50 and the utility port 26 all have a one-way or two-way gate associated with it.

The gates 32–48 may be one-way or two-way and preferably have two modes of operation. The CLOSED mode ensures that all signals received on the address bus 52 and data bus 54 are not passed on to its associated memory and I/O device or memory location. Furthermore, it is preferable that the gate exhibits a normally CLOSED mode, such that upon any failure, its operation is of a fail safe nature, ensuring that no data or signal passes the gate. Data and signal are terms used interchangeably in this description.

When the gate is in an OPEN mode of operation, address and data are passed without transformation through the gate to its physically associated memory and I/O device or memory location. Should the CPU operation need to read or change (write) information contained in a memory location or memory or I/O device, then only when the associated gate is open will data be transferred successfully through that gate.

In one relatively simple configuration, the computer comprises a CPU 10, an Access Monitor 28 and a plurality of memory locations an d I/O devices accessed by the CPU via associated gates which are under the control of the Access Monitor as depicted in FIG. 1.

The following example discloses the processes associated with the CPU gaining access to the main memory of the computer system.

In a preferred form a tag is an 8 bit value uniquely associated with each 32 bit word within the RAM main memory. That is, there is a 1 to 1 relationship of tags to 32 bit partitions within the RAM memory space. A tag may also be representative of a unique address of memory or I/O device.

In an example, when the CPU 10 needs to access a particular memory location, the first step requires the Access Monitor to decode the signals being issued by the CPU on the control and address lines respectively to determine the address being issued by the CPU. The second step is for the AM to obtain from its associated tag memory the unique tag which is allocated to that address. The third step is to compare the unique tag with allowable tag or tags contained within the AM so that if the tag value is allowable the gate associated with the device containing the address can be opened by the AM.

A number of different comparison techniques may be used, and in one example the unique tag for that memory location is compared with minimum and maximum tag values, held in the Access Monitor. The minimum and maximum tag values are representative of, for example, a particular classification of information that may be accessed by the CPU and furthermore whether that information can be read or written over. If the tag value falls within the predetermined range, the gate 44 associated with main memory 30 is opened and the desired memory location is accessed for either a read or write as required by the CPU. The gate 44 does not transform the information in any way, rather the gate allows the current CPU operation to complete and upon the next CPU operation, control is automatically passed back to the Access Monitor and the gate closes until opened under the control of the AM.

In a second example, with respect to an attempt to have the CPU access a memory or I/O device (for example a PCMCIA device which may be a modem), the first step as previously described comprises the Access Monitor monitoring and decoding the control and address lines which are transmitting signals issued by the CPU. The particular address issued by the CPU is decoded and this determines via a look-up function, performed by the AM, its unique tag. The unique tag is then compared with the minimum and maximum values held in the Access Monitor and the gate associated with the PCMCIA is opened or remains closed according to the result of the comparison. Whether the access is a read or write may also determine whether the gate is opened or remains closed.

In a preferred arrangement the trusted Access Monitor device may itself be available in the form of a PCMCIA card which is readily plugged into and out of the computer. The unique tags in its memory are customised to the desired security policy to be applied to the computer and its configuration. Tag ranges within the AM may be representative of the security level of the access that will be allowed by the CPU and therefore the AM will require appropriate physical security since its contents determine the security access policy of the computer it is fitted to. However, when security policy changes the Access Monitor can be easily changed as well.

In an alternative embodiment it may be possible for certain operations of the CPU to update tags, such as when the CPU is in supervisor mode. In this particular embodiment it is preferable to have a trusted gate located between the CPU and the tag memory.

In one example of the utilisation of the architectural concepts provided, the CPU may be an off the shelf device preferably having no cache which is configured solely from a preprogrammed ROM 12. Main RAM 30 preferably comprises a plurality of memory locations having 32 bit words each with its associated 8 bit tag, wherein each 8 bit tag is stored in tag memory 56 associated with the Access Monitor. One method of storing tag information is to provide a static 1 to 1 relationship of unique tag to each memory partition (location) and I/O device.

Each PCMCIA port used in such a computer is a uniquely addressed single or, in some instances, a two card port. Each memory or I/O location has a gate uniquely associated with each of the ports. The gate may be a two-way gate, allowing read and write operations if OPEN. In the configurations depicted in FIG. 1 the Video Graphics port 50 is a write only device, therefore the gate will only provide one-way transfer of data from the bus to the port. A gate, as previously described, can be one-way (unidirectional) or two-way (bidirectional) dependent on the type of device it controls access to and from. Preferably the Video Graphic port contains a video card with an address to enable pixel addressable graphics which is a common requirement in advanced computer devices, even though its functionality is of no consequence to the architectural features being described in this example.

A Utility Port will preferably contain a keyboard interface, LCD interface, a keypad interface and a real time clock interface and the gate associated therewith will be a two-way gate allowing read and write of data while the gate is opened. This particular configuration has been used because all I/O with the user occurs at one security level.

It will be appreciated by those skilled in the art, that the invention is not restricted in its use to the particular application described and neither is it restricted in its preferred embodiment with regard to the particular elements and/or features described herein. It will be appreciated that various modifications can be made without departing from the principles of the invention, therefore, the invention should be understood to include all such modifications within its scope.

The claims defining the invention are as follows:

1. A secure computer apparatus comprising a central processing means, at least one input means, at least one output means and bus means to communicate signals between said means all being untrusted, a trusted access monitor device connected to said bus means, a trusted gate device located between each of said at least one input means and said bus means, a further trusted gate device located between each of said at least one output means and said bus means, wherein said access monitor device controls either the one-way or tag-way direction of said signals through a respective gate device.

2. A secure computer apparatus in accordance with claim 1 further comprising at least one memory means operable with said central processing means.

3. A secure computer apparatus in accordance with claim 1 further comprising at least one memory means and a further trusted gate device located between said at least one memory means and said bus means.

4. A secure computer apparatus in accordance with claims 2 or 3 wherein at least one memory location in each of said memory means, and each of said at least one input and output means is associated with a security related attribute that can be processed by said central processing unit means, such that when the central processing unit means attempts to access a memory location or use said input or output means, said access monitor controls the one-way or two-way direction of said signals through a respective gate device according to said security related attribute.

5. A secure computer apparatus in accordance with claim 1 further comprising at least one memory means adapted for connection to one of said at least one input means which is at least readable by said central processing means when permitted by said access monitor device.

6. A secure computer apparatus in accordance with claims 3 or 5 wherein at least one memory location in each of said memory means, and each of said at least one input and output means is associated with a respective tag which is representative of a security related attribute that can be processed by said central processing unit means, such that when the central processing unit means attempts to access a tagged memory location or use said input or output means, said access monitor controls the one-way or two-way direction of said signals through a respective gate device according to respective tags.

7. A secure computer apparatus in accordance with claim 6 wherein said trusted access monitor device tags are changeable.

8. A secure computer apparatus in accordance with claim 1 wherein said access monitor controls the operation of said central processing means.

9. A secure computer apparatus in accordance with claim 1 wherein said secure computer apparatus is provided in a portable module adapted to connect to a peripheral input/output port of a computer device.

* * * * *